UNITED STATES PATENT OFFICE.

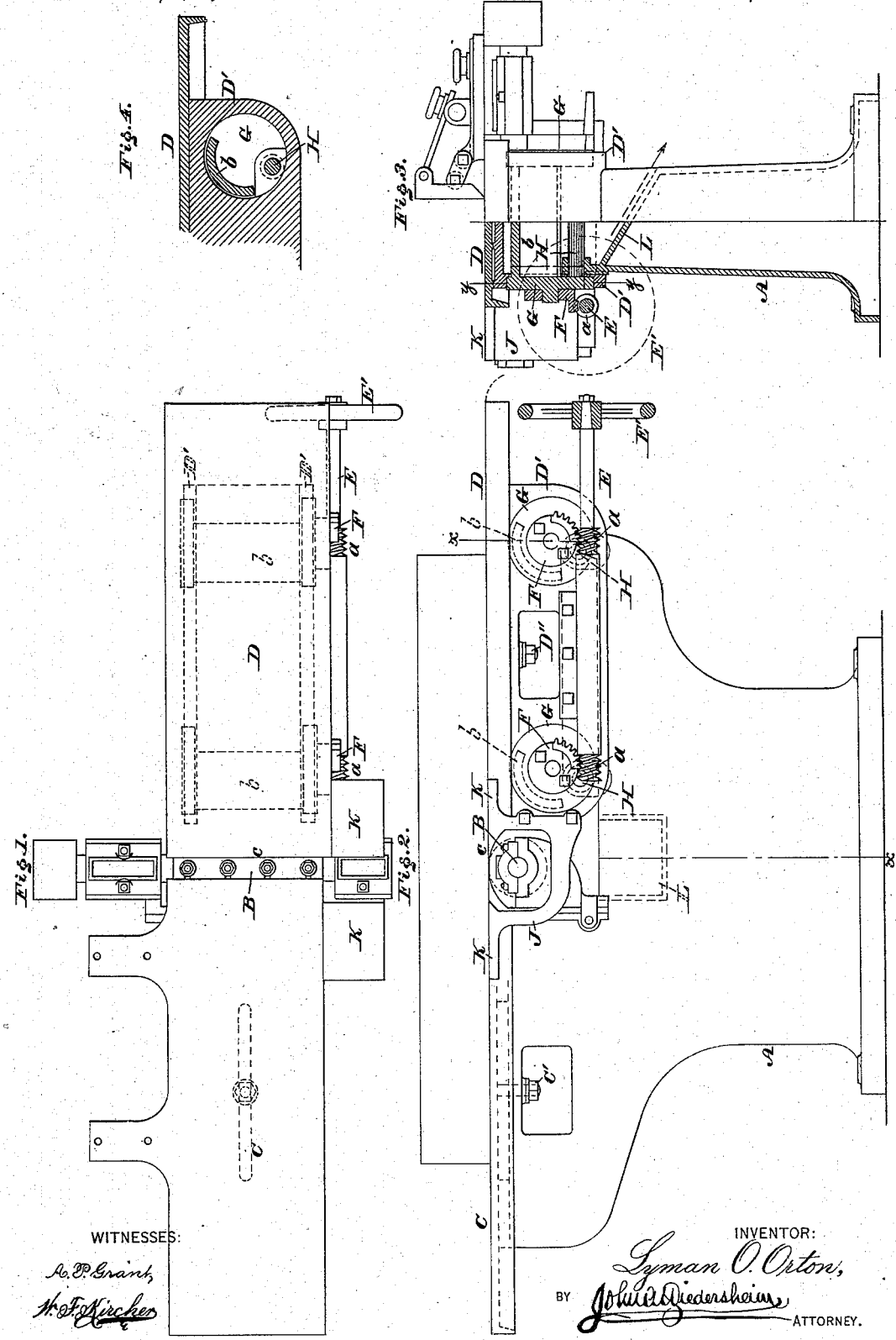

LYMAN O. ORTON, OF PHILADELPHIA, PENNSYLVANIA.

TABLE FOR PLANING-MACHINES.

SPECIFICATION forming part of Letters Patent No. 288,729, dated November 20, 1883.

Application filed May 10, 1882. (No model.)

*To all whom it may concern:*

Be it known that I, LYMAN O. ORTON, a citizen of the United States, residing in the city and county of Philadelphia, State of Pennsylvania, have invented a new and useful Improvement in Tables for Planing-Machines, which improvement is fully set forth in the following specification and accompanying drawings, in which—

Figure 1 is a top or plan view of the planing-machine embodying my invention. Fig. 2 is a side elevation thereof. Fig. 3 is an end elevation, partly sectional, in line $xx$, Fig. 2. Fig. 4 is a vertical section in line $yy$, Fig. 3.

Similar letters of reference indicate corresponding parts in the several figures.

My invention consists of a planing-machine having a table or bed which is vertically adjustable with relation to the cutting-cylinder or rotary cutter, and always occupies approximately the same distance from the circle described by the rotary cutter, the means employed being as hereinafter described. It further consists in providing the vertically-adjustable table with a lateral extension, whereby the machine is readily adapted for rabbeting.

Referring to the drawings, A represents the stand or base of the machine, and B the rotary cutter, which is suitably mounted on the frame thereof. C represents a stationary table or bed at the rear of the cutter B, and D represents a vertically-adjustable table or bed in front of said cutter. The table D has depending side pieces, D', to one of which is journaled a longitudinally-extending shaft, E, which has formed with or secured to it at intervals worms $a$—in the present case two in number.

F represents worm-wheels, which mesh with the worms $a$, and are bolted or otherwise firmly secured to disks G, which latter are fitted in openings in each side piece, D', of the table, formed in pairs and connected as one by means of a bar, rod, web, or plate, $b$, which in the present case is cast with said disks. The walls of the openings in the side pieces completely inclose the disks G, as seen in Fig. 4.

Rigidly connected to the frame of the machine are parallel shafts H, which extend horizontally and transversely and have their ends fitted eccentrically to the disks G, it being essential that the distance between the center of each shaft H and that of its disk is the same as the radius of the circle described by the rotary cutter. Each worm-wheel F is concentric with its disk G and this opening in which they turn.

The operation is as follows: The shaft E is rotated by the wheel E', or other suitable means, thus rotating the worm-wheels F and disks G as one. Owing to the shafts H, which are eccentrically fitted to the disks and fixed to the frame of the machine, said disks move on said fixed shafts H, and, rotating in the openings in the side pieces, D', press against the walls of said openings and move the table D to or from the rotary cutter relatively to the direction of rotation of the shaft E, so that said table is either raised or lowered. The table in its motion describes the arc of a circle whose radius is equal to the distance between the centers of the shafts H and the disks G, said distance being equal to the radius of a circle described by the rotary cutter. Consequently the end $c$ of the table which is next to the cutter always remains at an approximately-constant distance from the circle described by the cutter, regardless of the adjustment of the table. The shaft E being journaled to the side pieces, D', rises and falls with the latter.

To the side of the adjustable table is secured, by means of a casting, J, a laterally-projecting table, K, whose face is on a plane with the face of the table D, the two tables moving in harmony as one, the table K having a section or part in front and another part in rear of the rotary cutter, said table K overhanging at the side of the machine, and providing an extension of the table proper adjacent to the rotary cutter at the end thereof, whereby timber may be properly supported while being rabbeted or otherwise worked, during which operation the timber requires to be sustained beyond the side of the table proper. It will be seen that the two sections of the table K are connected by the casting, which is of the form of a bent arm, the latter encircling the end of the shaft of the cutter, the two sections of the table K and the adjustable table D thus operating as one in relation to the cutter for purpose of rabbeting, &c., as above stated, the timber resting on both the tables D and K.

Cast with or secured to the stand A or frame of the machine is an inclined chute, L, which extends under the rotary cutter and leads to the side of the stand. By this provision the shavings, &c., dropping from the rotary cutter fall on said chute L, and are thereby directed to a place of collection or discharge, or to a fan, so as to be conveyed elsewhere, as desired.

While the table C is generally termed "stationary," it, however, may be made longitudinally adjustable, as usual, a screw-bolt, C', being employed therefor, and the table D may have a similar provision by means of the screw-bolt D''. If desired, the table C may be adapted to be moved in the arc of a circle similar to the table D, and thus also remain the same distance from the circle described by the rotary cutter. In this case said table C will have depending side pieces, to which are connected adjusting devices similar to those of the table D.

I am aware that it is not broadly new in planing-machines to raise and lower a table and platform by means of worms and worm-wheels which mesh together and operate eccentrically-mounted disks, whereby the raising and lowering are directly effected.

Having thus described my invention, what I claim as new, and desire to secure by Letters Patent, is—

1. The depending side pieces, D', of the table having circular openings, in combination with the circular disks G, which are inclosed by and turn in said openings, and having eccentric axes or shafts H, which are journaled to the frame, the worm-wheels F, and the operating-shaft E, journaled to the side pieces, provided with worms $a$, substantially as and for the purpose set forth.

2. The movable table D, in combination with the eccentric disks G, the shafts H, the plates or bars $b$, which extend across from disk to disk, connecting each pair of disks as one, the concentric worm-wheels, the worms, and the shaft E, said shaft E and the disks, bars, and gearing being connected with the table D, and moving as one therewith, substantially as and for the purpose set forth.

3. The combination, with a cutter and tables arranged on opposite sides thereof, one of which is vertically adjustable in a horizontal position, of a lateral supplemental table attached to said adjustable table, constructed in two parts with a space between them, and connected by a bracket which allows said tables to move down below the plane of the cutter-shaft without coming in contact therewith, substantially as set forth.

LYMAN O. ORTON.

Witnesses:
W. A. CROSS,
H. W. THORN.